May 2, 1961

C. C. CLIFTON 2,982,430

STRADDLE TRAILER

Filed April 21, 1959

INVENTOR.
CHESTER C. CLIFTON
BY
*Anderson, Spangler & Wymore*
ATTORNEYS

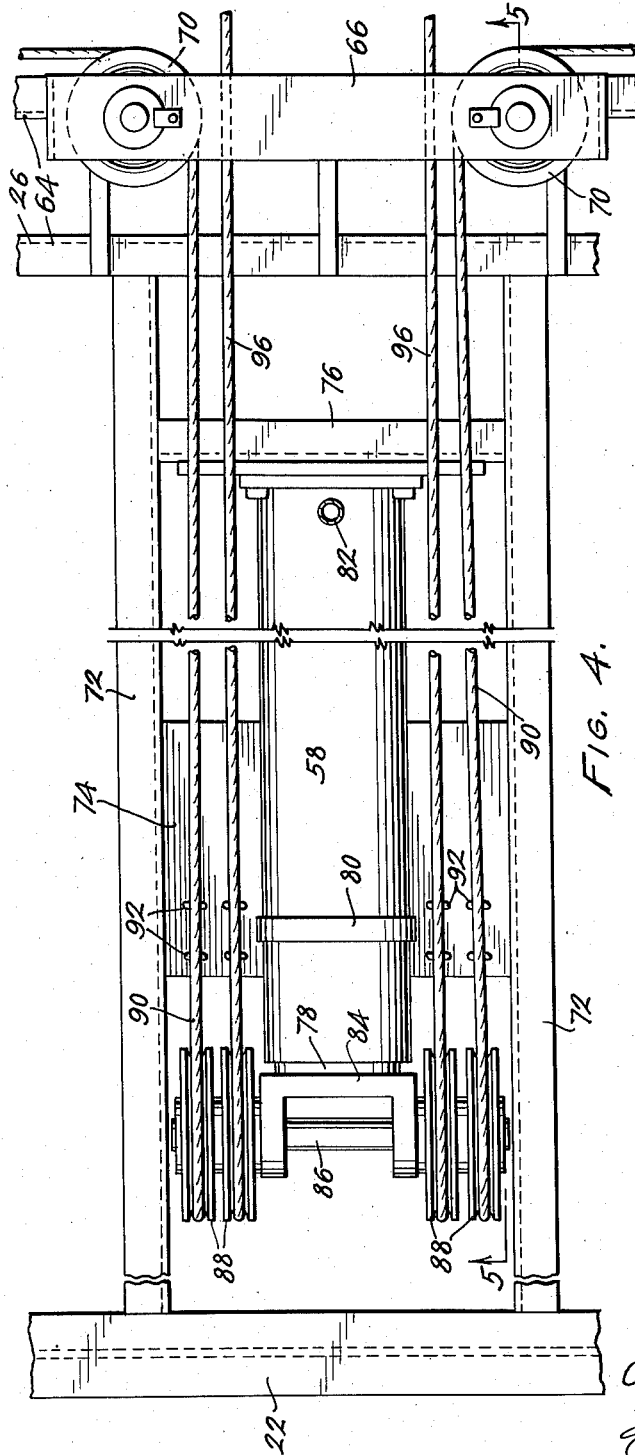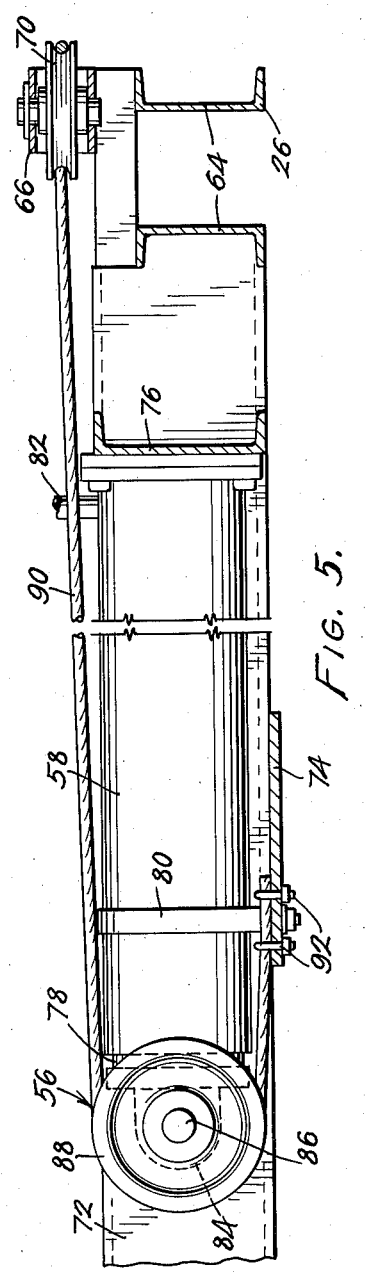

May 2, 1961 C. C. CLIFTON 2,982,430
STRADDLE TRAILER
Filed April 21, 1959 5 Sheets-Sheet 4
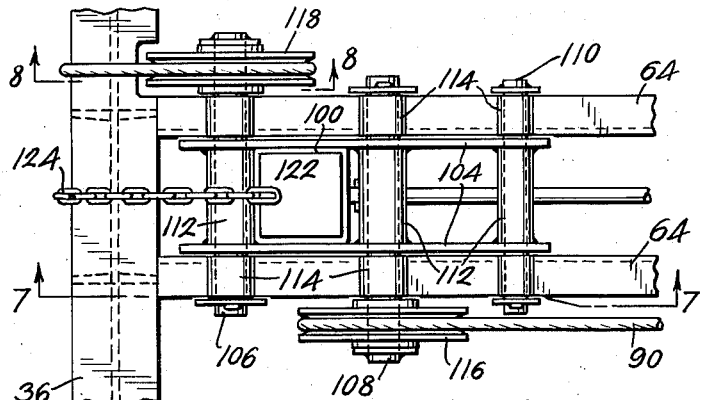
FIG. 6.
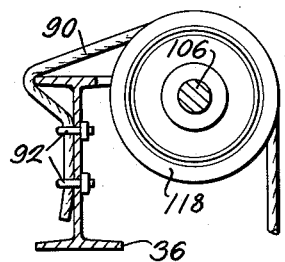
FIG. 8.
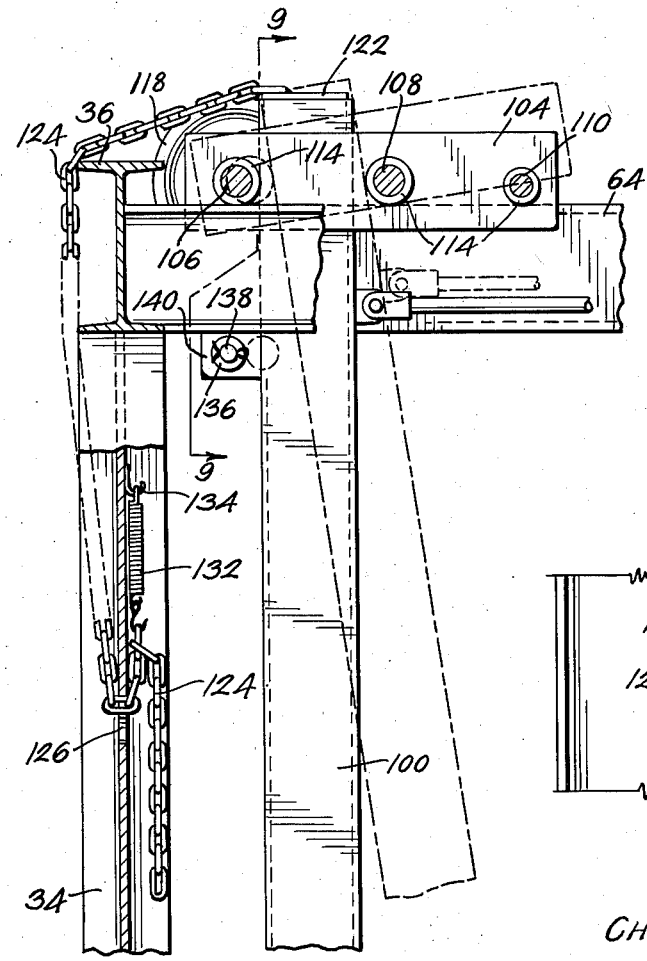
FIG. 7.
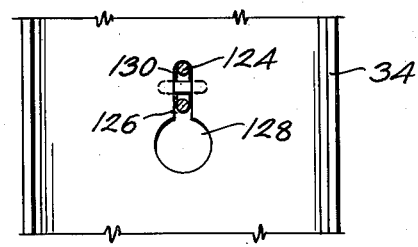
FIG. 9.
FIG. 10.
INVENTOR.
CHESTER C. CLIFTON
BY
ATTORNEYS May 2, 1961 C. C. CLIFTON 2,982,430
STRADDLE TRAILER
Filed April 21, 1959 5 Sheets-Sheet 5

INVENTOR.
CHESTER C. CLIFTON
BY
ATTORNEYS

United States Patent Office 2,982,430
Patented May 2, 1961

2,982,430
STRADDLE TRAILER
Chester C. Clifton, Denver, Colo., assignor to Mighty Mover Corporation, Denver, Colo., a corporation of Colorado
Filed Apr. 21, 1959, Ser. No. 807,833
15 Claims. (Cl. 214—392)

This invention relates to straddle-type load-carrying vehicles and, more specifically, to straddle trailers having hydraulically-operated hoist mechanism powered by the tractor engine.

In many businesses, freight-handling problems have a considerable influence on the overall profit picture. For example, it is not at all uncommon to find goods loaded and unloaded a half dozen times or more between the warehouse and dealers' shelves. Each of these operations, of course, involves a considerable expense in terms of labor and equipment costs. Also, many of today's large industrial operations are located at a considerable distance from their markets and, all too frequently, different facilities of the same company are widely separated from one another necessitating interplant shipments.

It is obvious, therefore, that versatile multi-purpose equipment adapted to reduce the number of instances in which freight must be handled can be used to advantage in lowering shipping costs. One of the most useful pieces of equipment designed to answer this need is the so-called straddle vehicle which is adapted to both load and unload palletized goods.

Most straddle vehicles are of the low-speed type having self-contained drives that are used primarily for yard haulage. Over-the-road hauling at highway speeds is out of the question for this type of straddle vehicle and their utility is, accordingly, somewhat limited. These units are used extensively in hauling lumber, light structural members and other uniform loads; however, they cannot handle heavy loads or those having an irregular size, shape or weight distribution.

Other attempts to solve this problem by providing equipment of a more versatile nature have taken the form of straddle-type trailers adapted to be hauled from place-to-place by ordinary tractors of the type used in the trucking industry. Although most of these units have the advantage of being operable at highway speeds rather than being restricted to yard operations, they still possess certain deficiencies which severely limit their overall utility.

First of all, the means by which the load is raised and lowered is seldom adapted for use with anything but the most uniform goods having a regular shape such as crated articles, prefabricated structural assemblies, steel beams, lumber, etc. Also, they cannot be used for hauling easily damaged articles like crates of fruit and vegetables.

Secondly, the mechanism used to maintain the load in place and prevent it from shifting customarily includes certain complex and expensive mechanical contrivances that are apt to malfunction and fail when most needed resulting in the loss or severe damage to the pay-load. In this same connection, few, if any, of these units provide means for centering the load or otherwise maintaining it in stable condition.

Finally, most of the prior art straddle trailers require a separate drive for the hoist mechanism completely apart from the tractor engine which is used exclusively for hauling the unit from place-to-place. In some instances, specially designed tractors are even required for hauling and/or operating the trailer.

It is, therefore, the principal object of the present invention to provide a novel and improved straddle trailer of a type adapted to haul loads from place-to-place at open highway speeds.

A second object is to provide a trailer of the class described that can be used with any one of a number of different types of conventional tractors.

Another objective is the provision of a straddle trailer that utilizes an improved hydraulic hoist operable from the power take-off of the tractor.

Still another object is to provide a straddle-type vehicle that automatically centers the load yet which does not require that the load be centered underneath the trailer before it can be picked up.

Additional objects of the invention are to provide a straddle trailer that can handle delicate loads without damage thereto, one that is capable of transporting unbalanced and irregular loads yet holds them securely in place, and a unit that is simple, relatively inexpensive, easy to operate, extremely versatile, and readily adaptable for use with any of the popular truck-type tractors.

Other objects will be in part apparent and in part pointed out specifically hereinafter in connection with the description of the drawings that follows, and in which:

Figure 4 is an enlarged fragmentary top plan detail showing the main lifting cylinder and associated pulleys and cables, portions thereof having been broken away to conserve space;

Figure 5 is a fragmentary section taken along line 5—5 of Figure 4;

Figure 6 is an enlarged fragmentary top plan detail of the chain-type snubbing assembly for the rolling pulley blocks;

Figure 7 is a fragmentary section taken along line 7—7 of Figure 6, portions of which have been broken away to better show the construction;

Figure 8 is a section taken along 8—8 of Figure 6;

Figure 9 is a fragmentary section taken along line 9—9 of Figure 7;

Figure 10 is a fragmentary elevation showing the details of the chain-lock keyslot;

Figure 1:
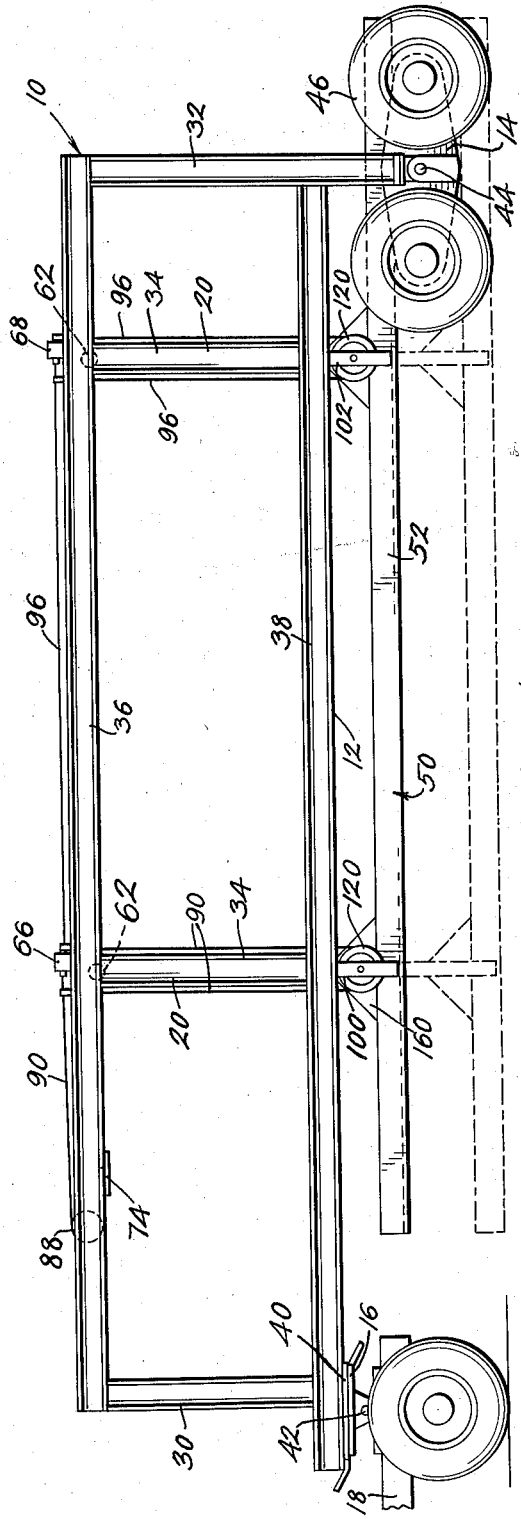
Figure 1 is a side elevation of the straddle trailer of the present invention showing the manner in which the front end thereof is supported on the fifth wheel of a conventional tractor.
Figure 2:
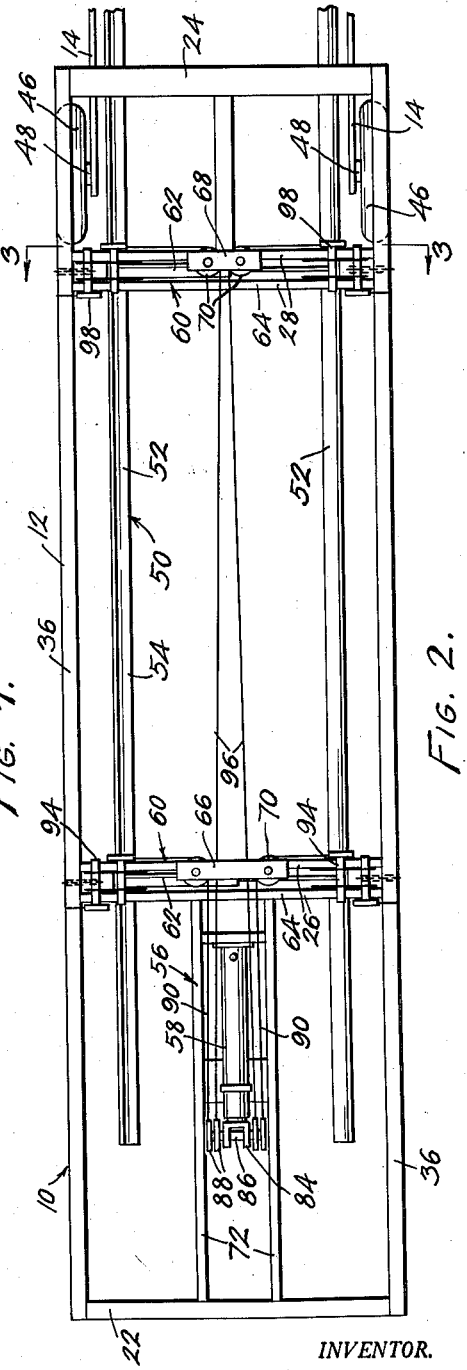
Figure 2 is a top plan view of the trailer in which certain portions have been broken away to conserve space.

Referring now to the drawings, and in particular to Figures 1 and 2 thereof, it will be seen that the straddle trailer of the present invention, which has been indicated in a general way by numeral 10, comprises a body 12 having an open bottom, preferably an open rear end supported on two pivotally attached tandem wheel mounts 14, and a front end detachably connected to the fifth wheel 16 of a conventional tractor 18 for side-to-side swinging movement about a substantially vertical pivot axis. In the particular form shown, the body 12 includes spaced substantially parallel sides 20 interconnected across the top by front and rear transverse elements 22 and 24, respectively, and front and rear pulley block tracks 26 and 28. In addition, each side 20 comprises front and rear uprights 30 and 32 and intermediate uprights 34 arranged in longitudinally spaced preferably parallel relation to one another between the front and rear ends of the body 12, all of which are interconnected by top and bottom longitudinal elements 36 and 38.

The front end of the body includes a transverse element extending across the bottom (not shown but similar to element 22) upon the underside of which is mounted a plate 40 carrying a standard trailer hitch (also not shown) adapted to form a releasable connection with the fifth wheel 16 of a tractor 18. Plate 40 and fifth wheel 16 permit the trailer to swing from side-to-side about a substantially vertical axis while the fifth wheel allows the trailer to move up and down relative to the tractor by reason of its rockable mounting on transverse pivot axis 42.

The rear end of the trailer, on the other hand, is wheel-supported on a pair of tandem wheel mounts 14 pivotally attached for tiltable movement about a transverse axis 44 located at the lower end of rear uprights 32. Each wheel mount 14 carries a pair of wheels 46 journalled for rotation on longitudinally spaced substantially parallel stub axles 48. A more detailed description of the preferred tandem wheel structure can be found in my copending application Serial No. 659,958, now U.S. Patent No. 2,896,803.

Now, in a general way in Figures 1 and 2, it can be seen that the load-engaging assembly which has been indicated broadly by numeral 50, includes a pair of transversely spaced and longitudinally extending shoes 52 operatively connected to the body for vertical movement to raise or lower the load and for lateral movement toward or away from one another to engage and grip or release the load. Each shoe 52 is constructed to provide an inturned flange or lip 54 adapted to move underneath a palletized load. The hydraulic hoist assembly, indicated generally by numeral 56, comprises a lifting cylinder 58 operatively connected to the shoes 52 in a manner to raise and lower same between the full and dotted line positions of Figure 1 by means of a series of cables and pulleys which will be described in detail presently. Similarly, the hydraulic load-engaging assembly which has been identified broadly by numeral 60 includes a pair of transverse cylinders 62 operatively connected to the shoes by a system of pulleys and cables in a manner to move them laterally toward or away from one another.

Figure 3:
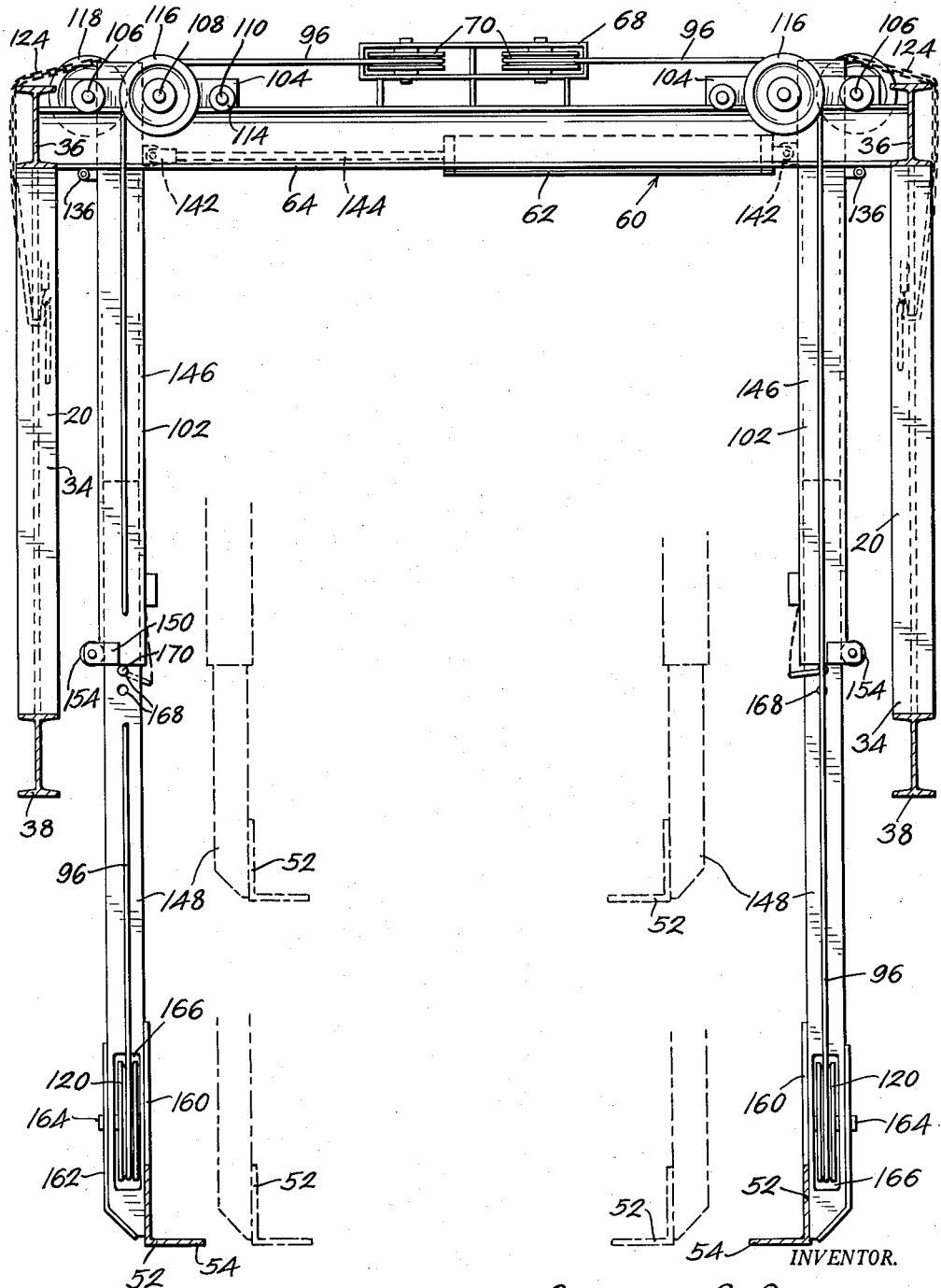
Figure 3 is a section taken along line 3—3 of Figure 2, but to an enlarged scale, showing some of the details of the lifting shoes and associated hydraulic and mechanical apparatus.

With reference now to Figures 3, 4 and 5 of the drawings, it will be seen that front and rear pulley block tracks 26 and 28 each comprise a pair of rails 64 arranged in spaced substantially parallel relation to one another and connected between the top longitudinal elements 36 of the body sides 20. Front and rear fixed pulley blocks 66 and 68, respectively, are mounted on top of the tracks 26 and 28 intermediate the ends thereof and each block includes a pair of sheaves 70 journalled for rotation about substantially vertical axes arranged in laterally spaced substantially parallel relation to one another. As seen most clearly in Figure 2, or by comparing Figures 3 and 4, the pulleys carried by the rear block 68 are mounted closer together than those journalled on the front block 66.

A pair of longitudinal elements 72 extending between track 66 and top transverse element 22 intermediate the sides 20 of the body, and a bedplate 74 and a transverse element 76 connected between said longitudinal elements 72, comprise a frame adapted to support main lifting cylinder 58. The rear end of the lifting cylinder is bolted or otherwise attached to transverse element 76 with the piston 78 extending forwardly therefrom between elements 72. A U-clamp 80 is shown used to attached the cylinder to the bedplate 74.

The hydraulic fluid inlet 82 for the main cylinder 58 is located at the rear end thereof and when fluid is introduced therethrough into the cylinder, the piston 78 extends forwardly. The front end of the piston is provided with a yoke 84 that carries a transverse pulley shaft 86 upon the projecting ends of which are journalled two pairs of sheaves 88 in side-by-side relation. A pair of front lift cables 90 are dead-ended on bedplate 74 by means of shackle-bolts 92 and extend forwardly therefrom around the outside sheaves 88 of each pair carried by the piston of the lift cylinder 58, thence rearwardly over the sheaves 70 carried by the fixed block 66 to the front dollies 94 supported for lateral rolling movement along front track 26. Similarly, a pair of rear lift cables 96 are dead-ended on the bedplate with shackle-bolts and extend forwardly therefrom around the inside pulleys 88 of each pair; whereupon, they are passed between the sheaves of the front fixed block 66 and are passed around the sheaves 70 of the rear fixed block 68 to the rear dollies 98 mounted for lateral rolling movement along the rear track 28.

Figure 3 and 6–9, inclusive, best illustrate the construction of the sets of dollies 94 and 98 that perform important functions in both the hoist assembly 56 and the load-engaging assembly 60. Dollies 94 and 98 are identical to one another in construction although mounted on different tracks. The upper ends of the front and rear sets of telescopable arms 100 and 102 that support the shoes 52, pass between the spaced rails 64 of the tracks where they are welded or otherwise attached to the sideplates 104 of the dollies. An outer shaft 106, an intermediate shaft 108 and an inner shaft 110 are mounted non-rotatably within tubular spacers 112 welded between the sideplates with their longitudinally extending axes arranged in transverse spaced relation. A pair of rollers on trunnions 114 is journalled for rotation on each shaft 106, 108 and 110 in position to roll along the upper flange of channel-shaped rails 64. In addition, intermediate shaft 108 carries a sheave 116 journalled for rotation thereon in position to receive the cable from the adjacent sheave 70 of the nearest fixed block. Outer shaft 106 also caries a sheave 118 journalled for rotation on the opposite side of the track and dolly from sheave 116. Note in this connection that sheaves 116 and 118 are nearly tangent to a plane defined by the groove in a sheave 120 journalled for rotation about a transverse axis on the lower end of telescopable arms 100 and 102, but on opposite sides thereof. In other words, sheaves 70, 116, 120 and 118 are preferably arranged such that the cables from the sheaves 88 on the lifting cylinder can pass around the sheaves 70 on the fixed blocks, along the rear face of the tracks, over sheaves 116 and down along the back of the arms, around sheaves 120 to the front of the arms where they extend upwardly again, and over sheaves 118 to a point where they are dead-ended on upper longitudinal elements 36 by means of shackle-bolts 92 as shown in Figure 8. Thus, each dolly, along with the telescopable arms suspended therefrom, is carried by the tracks for lateral rolling movement along the rails into position to engage and disengage a load positioned therebetween. This lateral movement is accomplished by means of the hydraulic load-engaging assembly 60, soon to be described in detail.

First of all, however, the structure that permits the telescopable arm and dolly assemblies to be tilted laterally relative to the sides 20 of the trailer body had best be described in connection with Figures 3, 6, 7, 9 and 10. The upper end of each telescopable arm is closed by a coverplate 122 to which the end link of a chain 124 is welded or otherwise attached. In Figures 7 and 10 it will be seen that each of the intermediate uprights 34 on the sides of the trailer body contain an inverted key-slot 126 having the lower portion 128 thereof sized to pass the chain while the upper portion 130 is adapted to lock on any one of the links. A tension spring 132 interconnecting the chain 124 with a hook 134 located inside the upright provides the means by which the link is releasably maintained in locked relation within the keyslot. Thus, chain 124 enables the upper end of the telescopable arms to be snubbed in any desired lateral position relative to the sides of the trailer body while permitting the lower end thereof to swing inwardly about shaft 106 as a fulcrum as shown most clearly by the full-line and dotted-line positions of Figure 7. Note, however, that the trunnions or rollers 114 carried on the ends of shaft 110 are spaced inward laterally from shaft 106 a sufficient distance to effectively prevent the lower ends of the telescopable arms from swinging outwardly away from one another. The degree to which the arms may tilt toward one another is limited by trunnions or rollers 136 that are carried on the ends of shaft 138 which extends longitudinally within bracket 140 mounted on the outside of the arms underneath shaft 106. Trunnions 136 are spaced slightly underneath the lower flange of the channel-shaped rails 64 of the tracks when the arms are in the substantially vertical position shown by full lines in Figure 7. When the arms are tilted into the dotted-line position of Figure 7, on the other hand, the trunnions engage the underside of the rails and prevent further tiltable movement thereof although they do not interfere with lateral movement of the arm and dolly assembly which is controlled in one direction by chain 124.

The hydraulic load-engaging assembly 60 that is used to effect both lateral and tiltable movement of the dollies, arms and shoes carried thereby can best be seen and will be described in connection with Figures 2, 3, 6 and 7 of the drawings. A transverse hydraulic cylinder 62 is pivotally connected to one telescopable arm of both the front and rear pairs thereof for pivotal movement by a pin and clevis connection 142; whereas, the piston rod 144 of each cylinder is similarly connected to the other arm of the pair. In the particular form shown, the cylinders 62 and piston rods 144 are each located between the rails 64 of the tracks so that the pivotal connections thereof with the arms lie spaced beneath shaft 106 that acts as a fulcrum for the dolly, arm and shoe asesmbly when tilted. Thus, with the length of chains adjusted to permit the arms to move toward one another laterally while still in substantially parallel relation until the shoes move underneath the sides of the load, continued actuation of the hydraulic cylinder 62 in a direction to pull the arms together will cause them to tilt toward one another and grip the load tightly. The chains and cylinders acting in opposite directions to one another and on opposite sides of the fulcrum defined by shaft 106 effectively prevent the shoes from moving apart to release the load until the fluid pressure within the hydraulic cylinders is relieved. Trunnions 136, on the other hand, prevent the shoes from swinging upwardly too far in the event that the chains have been snubbed too short in relation to the width of the load. It is also important to note that within the limits determined by the adjusted length of chains 124 and the swing permitted by trunnions 136, each arm and its associated dolly and shoe can move substantially independently of its pair. In other words, should the load be located underneath the trailer body closer to one side than the other, the first shoe and arm to engage the load will stop while the others continue to move laterally until they also either engage the load or are stopped by the chain and trunnions. Thus, the load need not be centered between the sides preparatory to actuation of the load-engaging assembly 60. Also, if because the load was off-center when gripped by the load-engaging assembly, the arms on one side of the trailer are tilted more than those on the other side, the load will automatically center itself as soon as it is lifted free of the ground by the hoist assembly provided that the effective lengths of the chains 124 are substantially equal. This self-centering feature is, of course, of utmost importance in over-the-road stability of the unit. When the shoes are locked against the load, the arms are preferably inclined toward one another slightly to insure proper shoe engagement.

Figure 11:
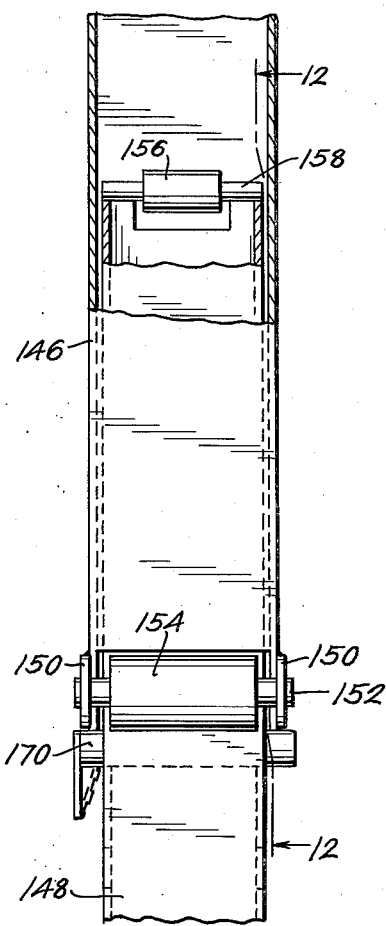
Figure 11 is an enlarged fragmentary side elevation of one of the lifting shoes with certain portions shown in section.
Figure 12:
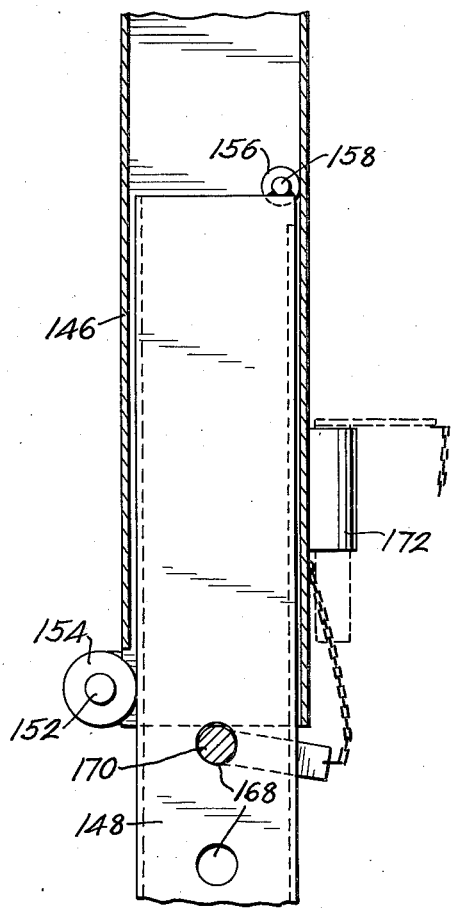
Figure 12 is a section taken along line 12—12 of Figure 11.

Now, before proceeding with the description of the operation of the hoist assembly 56, it will be well to examine the detailed construction of the pairs of telescopable arms 100 and 102 in connection with Figures 3, 11 and 12. Each arm includes two sections 146 and 148, one of which is mounted inside the other for relative telescopic movement. In the particular form illustrated herein, both sections are hollow and have a generally rectangular cross section. The outer section, which has been identified by reference numeral 146, is fixed in that it is attached to the dolly; whereas, the inner section 148 is movable therein and carries the shoe 52 attached to its lower end. A pair of lugs 150 are attached to the sides of each section 146 on the lower extremity thereof and positioned to project outward laterally therefrom. A pin 152 having a roller 154 mounted thereon for rotational movement is attached between the lugs with the inner surface of the roller extending inwardly slightly beyond the adjacent outside wall as shown most clearly in Figure 12. Similarly, another roller 156 is mounted for rotation on pin 158 located along the top of the inside wall of inner section 148 with the surface of the roller projecting inwardly slightly beyond the inner face of said wall as shown again in Figure 12. The normal forces exerted on the arms by a load positioned therebetween, of course spreads the shoes apart causing roller 154 to engage the outside wall of section 148 and roller 156 to engage the inside wall of section 146. Thus, with the arms loaded, the telescoping sections move relative to one another with only rolling frictional engagement except for the negligible sliding friction that may occur between the front and rear walls of the arm sections. The lower end of each inner section 148 is preferably reinforced with opposed backing plates 160 and 162 between which is mounted the shaft 164 that carries sheave 120 for rotational movement within aligned slots 166 formed in the front and rear walls of said section. The upper portion of section 148 contains one or more sets of longitudinally aligned openings 168 arranged in vertically spaced relation to one another. A pin 170 is selectively positionable in one of the sets of openings to cooperate with trunnions 36 bearing against the underside of the rails and prevent the arms from telescoping when the front end of the body is resting on and being supported by the shoes rather than the tractor. A tubular pin-receiver 172 may be attached to the arm as shown in Figure 12 to hold the pin when not in use.

Even though the hydraulic hoist assembly 56 has already been set forth in considerable detail in connection with the description of the various components that form a part thereof, a further analysis based upon the showing in Figures 1–8, inclusive, would seem to be in order. Both pairs of cables 90 and 96 are dead-ended on bedplate 74 and on longitudinal element 36. Each cable of each pair is reeved from the bedplate 74 forwardly around sheave 88, rearwardly around sheave 70, thence laterally over sheave 116, downwardly along the rear of the telescopable arm and around sheave 120, and upwardly along the front of the arm to the frame element 36 after passing over the sheave 118. Of course, cables 90 are reeved over fixed block 66, dollies 94 and the sheaves 120 carried by telescopable arms 100, all of which are located near the front end of the trailer body; whereas, cables 94 are similarly reeved over fixed block 68, dollies 98 and the sheaves 120 carried by telescopable arms 102 that lie adjacent the rear end of the trailer body. Obviously, the effective lengths of the various cables are adjusted such that both shoes 52 move up and down together in a common substantially horizontal plane. Once the hydraulic load engaging assembly has been actuated in a manner to contact and grip the load in the manner that has already been described in considerable detail, the unit is in condition for operation of the hoist assembly to raise the load free of the ground. Actuation of hydraulic cylinder 58 by admitting fluid under pressure into the rear end thereof through inlet 82 functions to extend piston 78 forwardly and raise the inner sections 148 of the arms by telescoping them into the outer sections 146 after the pins 170 have been removed from openings 168. Thus, the shoes 52 along with the load supported thereon are raised into the open-bottomed body of the trailer for movement therewith from place-to-place. Note that the load will be raised evenly by the shoes irrespective of any unbalanced weight distribution that may be present therein. Also, the height to which the load is raised off the ground can easily be controlled to maintain a low center of gravity and, therefore, a stable relationship between the load and trailer.

Figure 13:
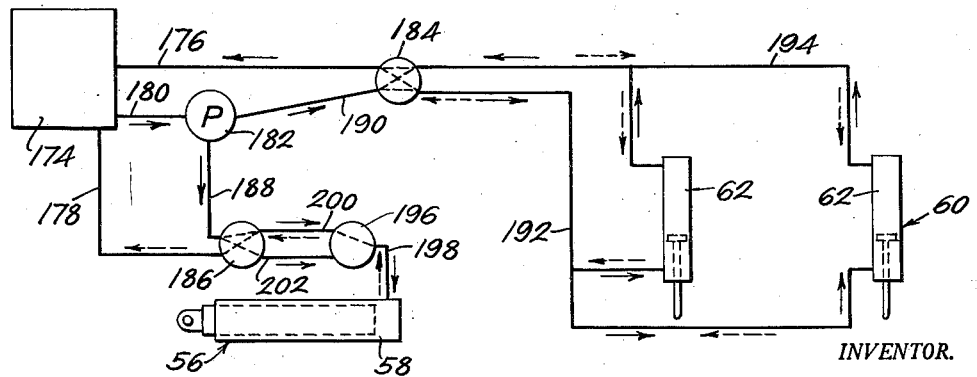
Figure 13 is a schematic diagram showing the connections and components of the hydraulic system.

Finally, with reference to Figure 13 of the drawings, the control system for the hydraulic hoist assembly 56 and the hydraulic load-engaging assembly 60 will now be described. Either the tractor or the trailer will carry a hydraulic fluid reservoir 174 into which are connected a pair of exhaust or return lines 176 and 178 along with a feed line 180. A pump 182 operated from the tractor engine by a conventional power-takeoff (not shown) is connected into the feed line 180 to take fluid from the reservoir 174 and deliver it to either control valve 184 or control valve 186 through branch feed lines 188 and 190 to which exhaust lines 176 and 178 are also connected. The head ends of the double-acting hydraulic cylinders 62 are connected in parallel with one another by line 192 which is, in turn, connected to control valve 184. Similarly, line 194 from the control valve 184 connects the rear ends of cylinders 62 in parallel with one another.

Valve 184 in its first operative position is adapted to deliver fluid taken from pump 182 and branch feed line 190 through line 192 into the head ends of the cylinders causing the shoes to close substantially simultaneously. The exhausted fluid from the rear ends of the cylinders is returned to the reservoir through lines 194 and 176 and valve 184. The flow of fluid in the first operative position of the valve has been indicated by the full-line arrows.

In the second operative position of the control valve 184, branch feed line 190 is connected to line 194 while exhaust line 176 is connected to line 192. Thus, the fluid follows the dotted-line arrow path into the rear ends of the cylinders and is exhausted through the front ends thereof to spread the shoes. The inoperative position of valve 184 cuts off both lines 192 and 194 from the pump, reservoir and one another to maintain a hydraulic lock adapted to hold the shoes in substantially fixed transverse relation.

The hydraulic hoist assembly 56 includes a normally-closed check valve 196 connected to the rear end of the single-acting hydraulic cylinder 58 by line 198 and to control valve 186 by lines 200 and 202. The first operative position of control valve 186 delivers fluid taken from the pump through branched feed line 188 to the check valve 196 through line 200. The fluid pressure opens check valve 198 and admits the fluid to the rear end of cylinder 58 through line 198 to raise the shoes. In the first operative position shown by the full-line arrows, lines 202 and 178 are disconnected from the cylinder and from each other as there is no exhaust fluid.

In the second operative position of control valve 186, on the other hand, branch feed line 188 is disconnected from line 200 and connected to line 202 which furnishes fluid under pressure to the check valve and biases it into open position. At the same time, valve 186 interconnects line 200 with exhaust line 178 so that the fluid can flow from the rear end of the cylinder 58 through line 198 and check valve and into the reservoir through lines 200 and 178. When valve 186 is in inoperative position, lines 200 and 202 are cut off from one another and from the pump which releases check valve 196 to closed position producing a hydraulic lock adapted to maintain the shoes in substantially fixed vertical position.

Having thus described the several useful and novel features of the straddle trailer of the present invention, it will be seen that the many worth while objectives for which it was designed have been achieved. Although but a single specific embodiment of the invention has been illustrated and described in connection with the accompanying drawings, I realize that certain changes and modifications therein may occur to those skilled in the art within the broad teaching hereof, hence, it is my intention that the scope of protection afforded hereby shall be limited only insofar as said limitations are expressly set forth in the appended claims.

What is claimed is:

1. In a straddle trailer of a type adapted to pick up, haul and discharge loads, an open bottomed body having sides and a top, supporting wheels mounted on opposite sides of the body adjacent the rear end thereof for rotational movement, a coupler carried by the body and adapted to detachably connect the front end thereof to the rear end of a tractor for relative pivotal movement about a substantially vertical axis, front and rear tracks interconnecting the sides of the body across the top thereof in longitudinally spaced substantially parallel relation to one another, right and left pairs of dollies mounted on opposite ends of the tracks for lateral rolling movement relative to one another, right and left pairs of arms suspended from the dollies for lateral movement therewith, each arm including an upper section and a lower section mounted one inside the other for relative telescoping movement, right and left shoes interconnecting the lower sections of the right and left pairs of arms for both vertical and lateral movement therewith, first hydraulic means operatively interconnecting the upper sections of the right and left pairs of arms, said first hydraulic means being adapted upon actuation in a first operative position to move the shoes toward one another into engagement with a load located therebetween, and said first hydraulic means being adapted upon actuation in a second operative position to move the shoes away from one another releasing a load held therebetween, and a second hydraulic means operatively interconnecting the upper and lower sections of each arm, said second hydraulic means being adapted upon actuation in a first operative position to raise the shoes substantially simultaneously elevating a load held therebetween, and said second hydraulic means being adapted upon actuation in a second operative position to lower the shoes substantially simultaneously letting down a load held therebetween.

2. The straddle trailer as set forth in claim 1 in which the first hydraulic means comprises a pair of hydraulic cylinders interconnecting the upper sections interconnecting the front arms and the rear arms of the right and left pairs thereof, said hydraulic cylinders being connected in parallel with one another and adapted to effect substantially simultaneous lateral relative movement of the shoes upon actuation thereof.

3. The straddle trailer as set forth in claim 1 in which the second hydraulic means comprises a hydraulic cylinder and cable and pulley means adapted upon actuation in first operative position to effect substantially simultaneous telescopic movement of each arm in a direction to shorten the effective length thereof, and in second operative position to effect substantially simultaneous telescopic movement of each arm in a direction to extend same.

4. The straddle trailer as set forth in claim 1 in which the dollies are each supported by the tracks for substantially vertical tiltable movement relative thereto in a direction to elevate an end thereof.

5. The straddle trailer as set forth in claim 1 in which adjustable stop means interconnect each dolly with the body, said stop means being adapted to limit the distance the dolly can move away from the sides of the body.

6. The straddle trailer as set forth in claim 1 in which removable stop means are provided on each arm adapted in engaged position to limit the relative telescopic movement of the upper and lower sections thereof in a direction to shorten the effective length of the arms.

7. The straddle trailer as set forth in claim 1 in which each track comprises a pair of longitudinally spaced substantially parallel rails, each dolly includes at least two pairs of transversely spaced rollers positioned and adapted to roll laterally along the top of the rails, and the upper section of the arm is suspended from the underside of the dollies for lateral movement therewith in between the rails.

8. The straddle trailer as set forth in claim 1 in which the first hydraulic means includes a control valve having two operative positions and an inoperative position, said valve being adapted in inoperative position to hydraulically lock the pairs of arms in a fixed transversely spaced relation to one another.

9. The straddle trailer as set forth in claim 1 in which the second hydraulic means includes a control valve having two operative positions and an inoperative position, and a check valve having an operative position and an inoperative position, the control valve being operatively connected to the check valve in inoperative position and being adapted to hydraulically lock each arm in fixed telescoped relation.

10. The straddle trailer as set forth in claim 2 in which the hydraulic cylinders of the first hydraulic means are both of the double-acting type.

11. The straddle trailer as set forth in claim 3 in which the hydraulic cylinder of the second hydraulic means is mounted on top of the body and includes a piston mounted for reciprocal movement therein in the direction of the length of said body, and the cable and pulley means includes a first pulley mounted for rotation on the lower end of the lower section of each arm, second pulleys mounted for rotation on the piston of the hydraulic cylinder for reciprocal movement therewith, and cables operatively interconnecting each of the first pulleys with one of the second pulleys, said cables being adapted to telescope the arms in a direction to shorten same upon actuation of the second hydraulic means in second operative position, and said cables being adapted to release the arms for extendable movement upon actuation of the second hydraulic means in second operative position.

12. The straddle trailer as set forth in claim 3 in which the hydraulic cylinder of the second hydraulic means is of the single-acting type having a piston mounted for reciprocal movement therein in the direction of the length of the body, and the cable and pulley means comprises a first pulley mounted for rotation at the lower end of the lower section of each arm about a transverse axis, four second pulleys mounted in side-by-side relation on the piston of the hydraulic cylinder of the first hydraulic means for independent rotation about a transverse axis, a pair of third pulleys mounted on each track intermediate the ends thereof for rotation about a substantially vertical axis, fourth and fifth pulleys mounted on each dolly for independent rotation about longitudinal axes, and cables having the free ends thereof dead-ended on the body reeved over each of the fifth pulleys, then around the first pulley of the arm carried by the dolly having said fifth pulley mounted thereon, over the fourth pulley of said same dolly, around one of the third pulleys on the same track with said dolly, and finally, over one of the second pulleys.

13. The straddle trailer as set forth in claim 4 in which each dolly includes vertically spaced pairs of trunnions mounted on the outside end thereof in position to lap the track, said trunnions being adapted to permit the inner ends of the dollies to raise off the track in order that the arms may tilt inwardly moving the shoes toward one another.

14. The straddle trailer as set forth in claim 5 in which the dollies are mounted on the tracks for tiltable movement relative thereto about a longitudinal axis located at the outer end thereof, and the first hydraulic means and adjustable stop means are adapted upon actuation of said first hydraulic means in a direction to move the arms toward one another to tilt the dollies about said axis in a direction to move the shoes together.

15. The straddle trailer as set forth in claim 6 in which a fixed stop is provided on the upper section of each arm positioned to engage the underside of the track and prevent said arm from moving vertically relative thereto.

References Cited in the file of this patent

UNITED STATES PATENTS

| | | |
|---|---|---|
| 1,798,412 | Grab | Mar. 31, 1931 |
| 2,259,558 | Evans | Oct. 21, 1941 |
| 2,316,938 | Dimick | Apr. 20, 1943 |
| 2,433,822 | Bartholomew | Dec. 30, 1947 |
| 2,583,075 | Anderson | Jan. 22, 1952 |
| 2,772,010 | Buehring | Nov. 27, 1956 |